US010303718B1

(12) United States Patent
Hollmann

(10) Patent No.: US 10,303,718 B1
(45) Date of Patent: May 28, 2019

(54) SPORTS VIDEO SEARCH ENGINE

(71) Applicant: Robert A. Hollmann, Keller, TX (US)

(72) Inventor: Robert A. Hollmann, Keller, TX (US)

( * ) Notice: Subject to any disclaimer, the term of this patent is extended or adjusted under 35 U.S.C. 154(b) by 580 days.

(21) Appl. No.: 15/064,896

(22) Filed: Mar. 9, 2016

Related U.S. Application Data

(60) Provisional application No. 62/130,557, filed on Mar. 9, 2015.

(51) Int. Cl.
*G06F 16/00* (2019.01)
*G06F 16/78* (2019.01)
*G06F 3/0481* (2013.01)
*G06F 3/0482* (2013.01)
*G06F 3/0484* (2013.01)
*G06F 16/951* (2019.01)

(52) U.S. Cl.
CPC ........ *G06F 16/7867* (2019.01); *G06F 3/0482* (2013.01); *G06F 3/04817* (2013.01); *G06F 3/04842* (2013.01); *G06F 16/951* (2019.01)

(58) Field of Classification Search
CPC .. G06F 3/0482; G06F 3/0481; G06F 3/04817; G06F 9/542; G06F 17/30525; G06F 17/30548; G06F 17/30554; G06F 17/30967; G06F 17/30964; G06F 17/30368; G06F 17/30371; G06F 3/04842
See application file for complete search history.

(56) References Cited

U.S. PATENT DOCUMENTS

| | | | | |
|---|---|---|---|---|
| 8,484,564 B1* | 7/2013 | Marti | ...................... | G06Q 50/01 463/42 |
| 8,615,504 B2* | 12/2013 | Urmy | ................. | G06Q 10/0631 707/706 |
| 9,978,043 B2* | 5/2018 | Jon | ..................... | G06Q 10/1095 |
| 2008/0065649 A1* | 3/2008 | Smiler | .................. | G06F 16/972 |
| 2008/0147619 A1* | 6/2008 | O'Malley | .............. | G06Q 30/02 |
| 2011/0071901 A1* | 3/2011 | Fries | ...................... | G06Q 30/02 705/14.48 |
| 2011/0246889 A1* | 10/2011 | Moore | ................... | G06Q 10/04 715/719 |
| 2012/0240080 A1* | 9/2012 | O'Malley | ............... | H04L 67/26 715/810 |
| 2014/0123072 A1* | 5/2014 | Bhowmick | ........... | G06F 3/0482 715/838 |

* cited by examiner

*Primary Examiner* — Merilyn P Nguyen
(74) *Attorney, Agent, or Firm* — Eldredge Law Firm, LLC; Richard Eldredge; Beth Felix

(57) ABSTRACT

A system for selecting videos includes a computer having a display, the computer having a search engine and a database operably associated with the computer, the database being configured to store a plurality of videos and the computer being configured to show the plurality of videos via the display. The search engine includes a first search toggle bar of age preference and having a plurality of icons indicating the age preference; a second search toggle bar of a type of sporting event and having a plurality of sporting event icons; a third search toggle bar of a type of team and having a plurality of team icons; and a fourth search toggle bar of a type of unique feature of the type of sporting event.

8 Claims, 3 Drawing Sheets

SPORTS VIDEO SEARCH ENGINE

BACKGROUND

1. Field of the Invention

The present invention relates generally to entertainment search engines, and more specifically, to a sports search engines for replaying vintage sport videos and broadcasts.

2. Description of Related Art

Sport activities such as football, baseball, tennis, golf, and the like are a well known recreational activities for all genders and ages. It is common practice to record such sporting activities for personal or commercial use in real-time or for later viewing. It should be appreciated that the sport videos can be viewed via television, computer, portable tablet, phone, and other similarly suitable media means.

In one exemplary embodiment, as depicted in FIG. 1, a simplified schematic illustrates a user 103 viewing a sporting video via a computer 105 having a display 107. The computer 105 includes the necessary software and hardware to display the video and to communicate with a database 109 via cloud services 111. As shown in FIG. 2, the system 201 is used to broadcast the sporting event. However, a shown with a toggle line 200, there are a myriad of other shows and sporting videos the user 103 must sift through to find the desired video. For example, box 203 is a drama movie, box 205 is a kids basketball video, box 207 is an adult soccer game, box 209 is an adult fencing event, box 211 is a drama show, box 213 is a tennis shown, and box 215 is a track-and-field event.

Thus, as commonly shown in FIG. 2, the user is readily overwhelmed with choices and the burden of sifting through a large selection of shows, movies, other sporting events, and the like to finally reach the desired sporting show.

Although great strides have been made in the area of video search engines, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
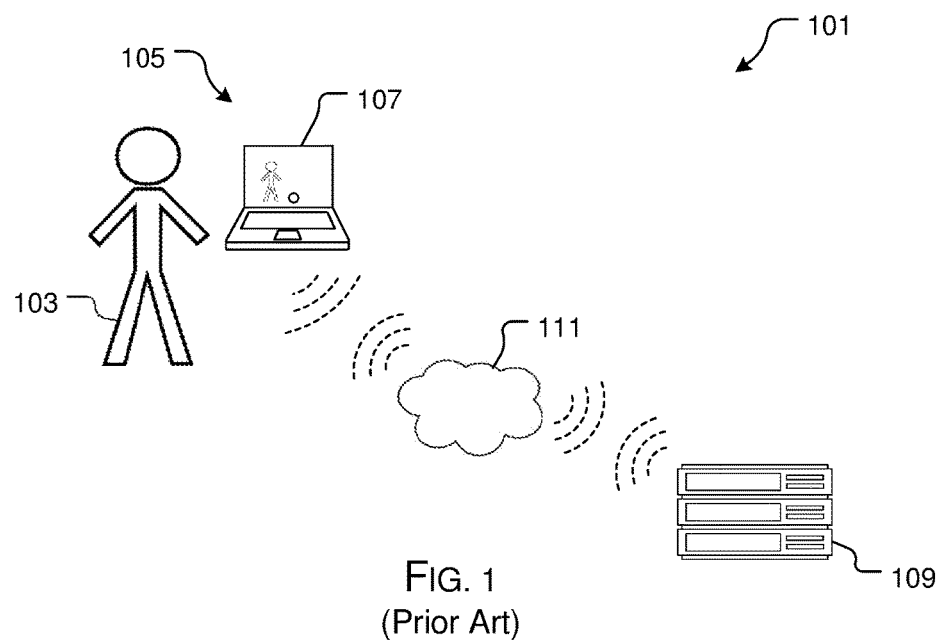
FIG. 1 is a simplified schematic of a conventional search engine system.
Figure 2:
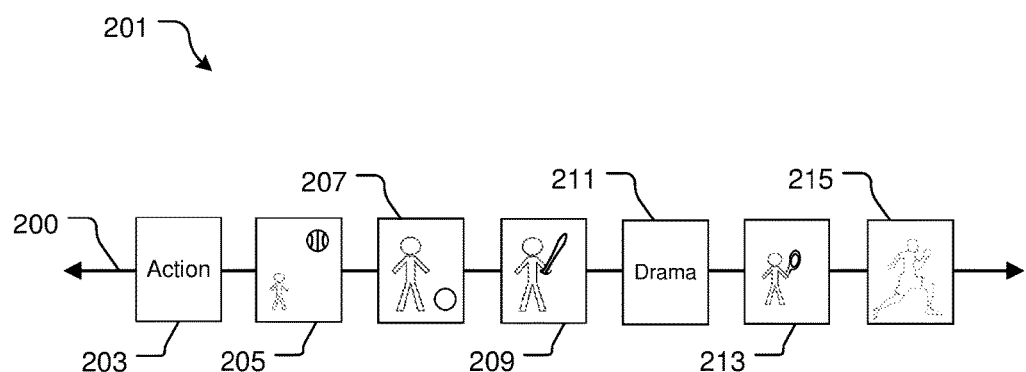
FIG. 2 is a simplified schematic of a toggle bar of the search engine of FIG. 1.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional systems and methods to search for sporting events. Specifically, the system and method of use in accordance with the present application provides rapid and effective means to find a vintage sporting show with a unique toggle bar search engine. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 3:
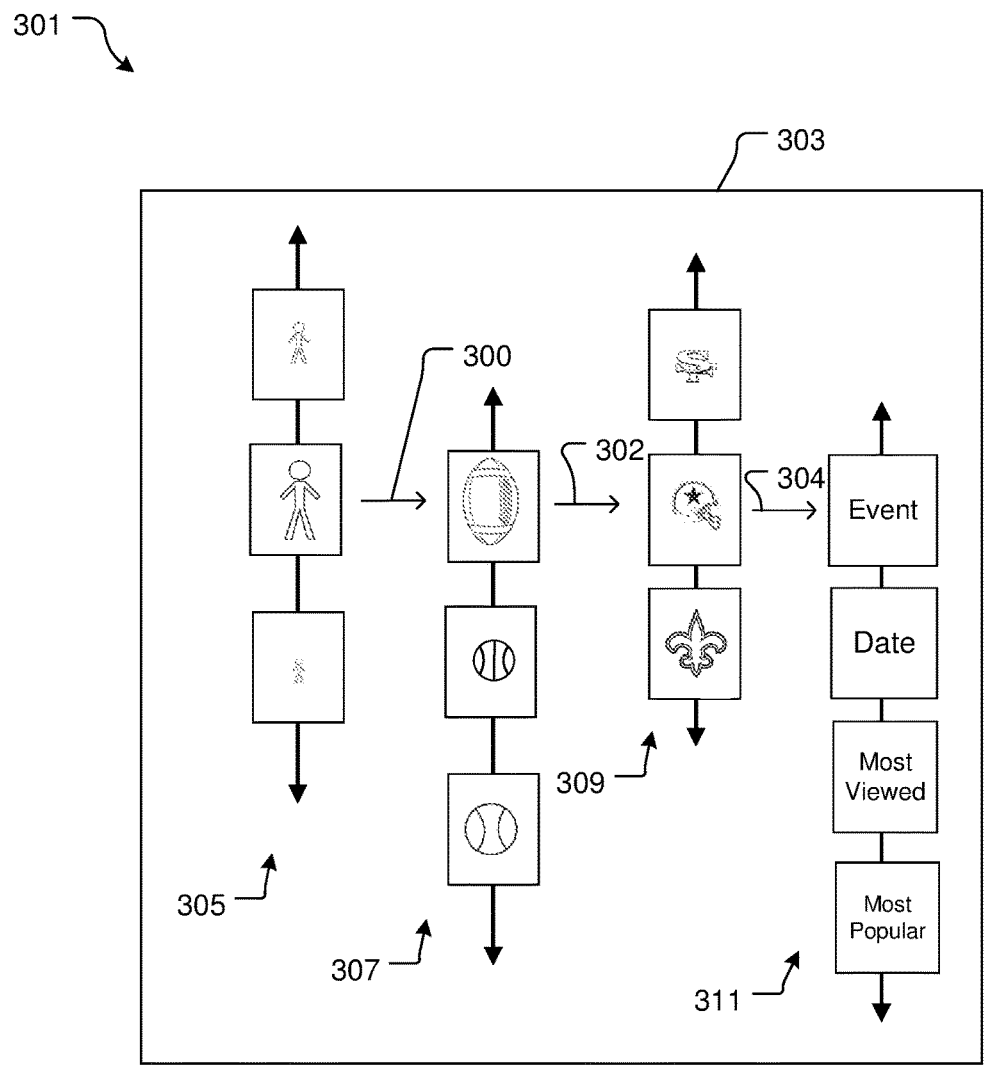
FIG. 3 is a sports toggle bar in accordance with a preferred embodiment of the present application.
Figure 4:
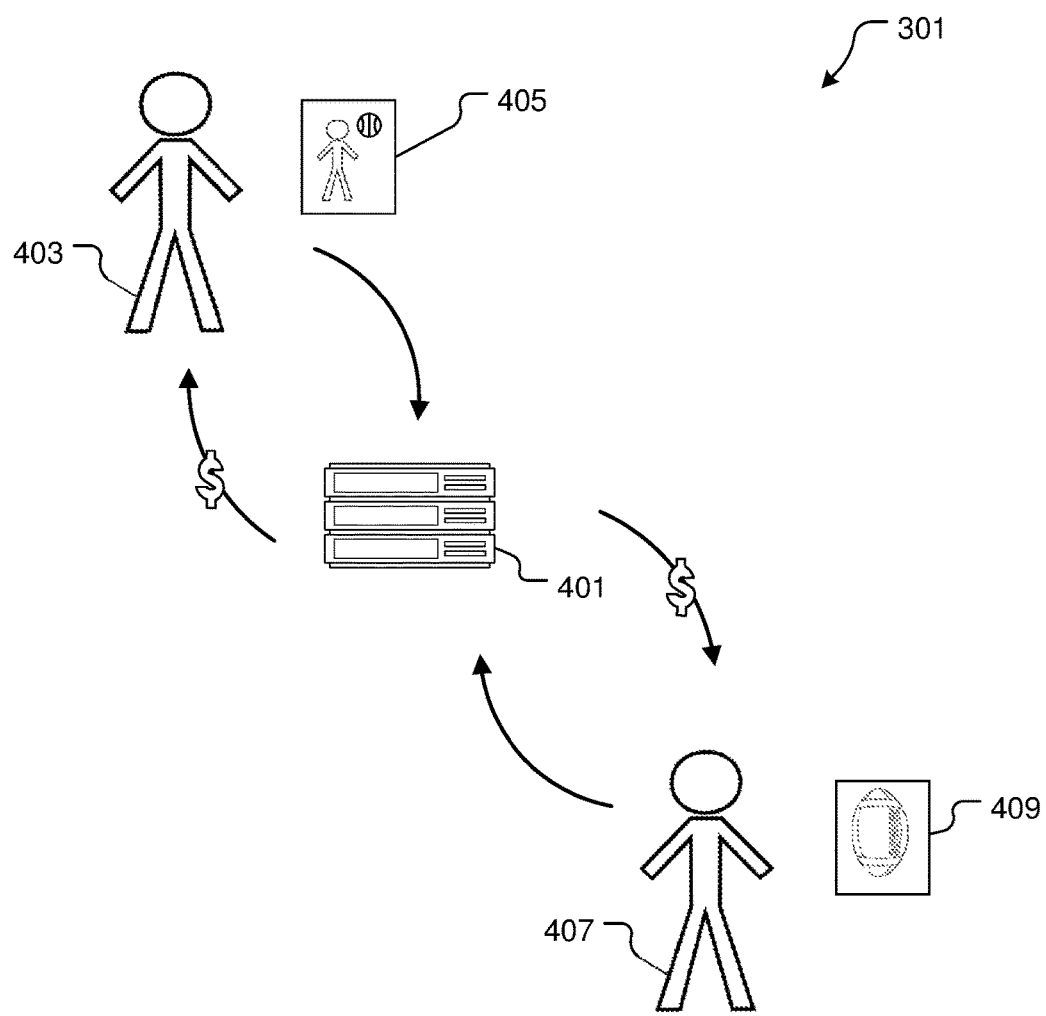
FIG. 4 is a system of the toggle bar of FIG. 3.

Referring now to the drawings wherein like reference characters identify corresponding or similar elements throughout the several views, FIGS. 3 and 4 depict simplified schematic views of the search engine system 301 in accordance with a preferred embodiment of the present application. It will be appreciated that the system 301 overcomes one or more of the above-listed problems commonly associated with the conventional systems and methods to search for a desired sporting show.

In the contemplated embodiment, system 301 includes a search engine 303 operably associated with database 401 and configure to rapidly and effectively assist the user in searching for a desired sporting show. It will be appreciated that database 401 communicates with a computer, e.g., computer 105, or similar means that in turn displays the stored videos within the database 401. Thus, system 301 incorporates one or more of the features of system 101.

It should be understood that the features discussed herein with respect to system 301 are solely for the use of sporting events that can be broadcasted in real-time or pre-recorded.

Referring back to FIG. 3, search engine 303 includes one or more of the process of first selecting the age and/or gender group related to the sporting event, as depicted by toggle bar 305, selecting the type of sporting event, as depicted with toggle bar 307, the team, as depicted by toggle bar 309, and added unique features of the video, as depicted with toggle bar 311.

As depicted in FIG. 3, the user has chosen an adult sports event via toggle bar 305, football via toggle bar 307, the Dallas cowboys via toggle bar 309, and the event via toggle bar 311, e.g., the super bowl, that the cowboys played in. After such criteria is chosen by the user, the search engine screen 303 is configured to display the plurality of videos that meet the choice for selection.

In the contemplated embodiment, the unique features of toggle bar 311 include the event played at, the date, most viewed video, the most popular videos, and the like.

Thus, one of the unique features believed characteristic of the present application is the use of a plurality of toggle bars that effectively organize the search criteria of selection. It should be noted through, that the present invention and method of use is not limited to toggle bars, but could include other means to make selections in a like fashion. In the contemplated embodiment, the screen 303 displays the different toggle bars, as depicted, and the toggle bars traverse in an upward and downward direction within screen 303 until a desired chose is made, as indicated by a line of markers 300, 302, and 304.

Referring now to FIG. 4, a simplified schematic of system 301 is shown. The system 301 includes a central database 401 that one or more persons 403, 407 could upload videos, e.g., video 405 or video 409, which therein turn an optional monetary gain could be obtained as a licensing agreement. For example, a person 403 could upload a sporting video that highlights the sporting event and upload the video to the database 401, and receives a predetermined monetary gain as third party watches the video. It is also contemplated charging a monetary value to the user to view the videos via system 301. Accordingly, in one contemplated embodiment, third parties can contribute to the videos stored within a central database and could charge for viewing access.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A system for selecting videos, comprising:
    a computer having a display, the computer having a search engine, the search engine having a plurality of interactive toggle bars that align adjacent to each other, the plurality of interactive toggle bars, having:
    a first search toggle bar of age preference and having a plurality of interconnected icons indicating the age preference;
    a second search toggle bar of a type of sporting event and having a plurality of sporting event icons, the second search toggle bar is positioned adjacent to the first search toggle bar and configured to move parallel relative to the first search toggle bar;
    a third search toggle bar of a type of team and having a plurality of team icons, the third search toggle bar is positioned adjacent to the second search toggle bar and configured to move parallel relative to the second search toggle bar; and
    a fourth search toggle bar of a type of unique feature of the type of sporting event, the fourth search toggle bar is positioned adjacent to the third search toggle bar and configured to move parallel relative to the third search toggle bar,
    wherein an age preference icon from the first search toggle bar, a sporting event icon from the second search toggle bar, a team icon from the third search toggle bar, and a unique feature from the fourth search toggle bar are selected on a line of markers for selection of a desired viewing, wherein the first search toggle bar, the second search toggle bar, the third search toggle bar and the fourth search toggle bar traverse in an upward and downward direction within a search engine screen until desired choices of the age preference icon, the sporting event icon, the team icon and the unique feature are made; and
    a database operably associated with the computer, the database being configured to store a plurality of videos and the computer being configured to show the plurality of videos via the display;
    wherein the search engine is configured to narrow the plurality of videos within desired viewing in accordance with the selection of the first search toggle bar, the second search toggle bar, the third search toggle bar, and the fourth search toggle bar.

2. The system of claim 1, the search engine further comprising: a marker line indicating a selection of the first search toggle bar, the second search toggle bar, the third search toggle bar, and the fourth search toggle bar.

3. The system of claim 1, wherein the database is configured for the plurality of videos to be uploaded by third parties.

4. The system of claim 3, wherein the computer is configured to account for a number of times the plurality of videos are viewed.

5. The system of claim 4, wherein the computer is configured to record compensation to the third party for the number of times the plurality of videos are viewed.

6. A method, comprising:
    providing a system for selecting videos, comprising:
    a computer having a display, the computer having a search engine, the search engine having a plurality of interactive toggle bars that align adjacent to each other, the plurality of interactive toggle bars, having:
    a first search toggle bar of age preference and having a plurality of interconnected icons indicating the age preference;
    a second search toggle bar of a type of sporting event and having a plurality of sporting event icons, the second search toggle bar is positioned adjacent to the first search toggle bar and configured to move parallel relative to the first search toggle bar;
    a third search toggle bar of a type of team and having a plurality of team icons, the third search toggle bar is positioned adjacent to the second search toggle bar and configured to move parallel relative to the second search toggle bar; and a fourth search toggle bar of a type of unique feature of the type of sporting event, the fourth search toggle bar is positioned adjacent to the third search toggle bar and configured to move parallel relative to the third search toggle bar, wherein an age preference icon from the first search toggle bar, a sporting event icon from the second search toggle bar, a team icon from the third search toggle bar, and a unique feature from the fourth search toggle bar are selected on a line of markers for selection of a desired viewing, wherein the first search toggle bar, the second search toggle bar, the third search toggle bar and the fourth search toggle bar traverse in an upward and downward direction within a search engine screen until desired choices of the age preference icon, the sporting event icon, the team icon and the unique feature are made; and a database operably associated with the computer, the database being configured to store a plurality of videos and the computer being configured to show the plurality of videos via the display;

wherein the search engine is configured to narrow the plurality of videos within desired viewing in accordance with the selection of the first search toggle bar, the second search toggle bar, the third search toggle bar, and the fourth search toggle bar;

selecting a video for viewing via the computer by toggling through the first search toggle bar, the second search toggle bar, the third search toggle bar, and the fourth search toggle bar; and viewing the video via the display of the computer.

7. The method of claim 6, further comprising:

recording a number of times the video is viewed.

8. The method of claim 7, further comprising:

providing compensation to a third party that uploaded the video based upon the number of times the video was viewed.

\* \* \* \* \*